US010285555B2

(12) United States Patent
Radmand

(10) Patent No.: US 10,285,555 B2
(45) Date of Patent: May 14, 2019

(54) ELECTRIC SHOCK GUARD FOR APPLIANCE

(71) Applicant: Achaemenid, LLC, Stratford, CT (US)

(72) Inventor: Reza Radmand, Brookline, MA (US)

(73) Assignee: Achaemenid, LLC, Stratford, CT (US)

(*) Notice: Subject to any disclaimer, the term of this patent is extended or adjusted under 35 U.S.C. 154(b) by 0 days.

(21) Appl. No.: 15/966,641

(22) Filed: Apr. 30, 2018

(65) Prior Publication Data

US 2018/0310791 A1    Nov. 1, 2018

Related U.S. Application Data

(60) Provisional application No. 62/572,287, filed on Oct. 13, 2017, provisional application No. 62/492,857, filed on May 1, 2017.

(51) Int. Cl.
| A47L 9/28 | (2006.01) |
| H02H 9/04 | (2006.01) |
| H05F 3/02 | (2006.01) |
| A47L 5/26 | (2006.01) |
| A47L 9/04 | (2006.01) |
| A47L 9/32 | (2006.01) |
| H05F 1/00 | (2006.01) |

(52) U.S. Cl.
CPC .............. *A47L 9/2889* (2013.01); *A47L 5/26* (2013.01); *A47L 9/0477* (2013.01); *A47L 9/2884* (2013.01); *A47L 9/322* (2013.01); *H02H 9/042* (2013.01); *H05F 1/00* (2013.01); *H05F 3/02* (2013.01)

(58) Field of Classification Search
CPC ........ A47L 9/2889; A47L 5/26; A47L 9/0477; A47L 9/2884; A47L 9/322; H02H 9/042; H05F 3/02; H05F 1/00; B60L 11/1818; H02J 7/0029; H01R 13/5202; H01R 13/5219; H01R 2201/26
USPC .......................................... 361/212
See application file for complete search history.

(56) References Cited

U.S. PATENT DOCUMENTS

| 5,810,525 A | 9/1998 | Ector, Sr. |
| 6,330,430 B1 | 12/2001 | Jensfelt |
| 8,446,125 B2 * | 5/2013 | Mkhitarian ........... H02J 7/0045 320/105 |
| 9,093,773 B2 * | 7/2015 | Pietila ................. H01R 13/447 |
| 2005/0133113 A1 * | 6/2005 | Carder, Sr. .......... B67D 7/3236 141/392 |
| 2007/0114141 A1 | 5/2007 | Mikesell et al. |
| 2007/0247793 A1 | 10/2007 | Carnevali |
| 2008/0310094 A1 | 12/2008 | Burns |
| 2009/0277970 A1 * | 11/2009 | Lind ....................... B05B 1/20 239/3 |

(Continued)

OTHER PUBLICATIONS

International Search Report and Written Opinion of International App. No. PCT/US18/30178, dated Jul. 19, 2018, which is in the same family as U.S. Appl. No. 15/966,641, 11 pgs.

*Primary Examiner* — Thienvu V Tran
*Assistant Examiner* — Nicolas Bellido
(74) *Attorney, Agent, or Firm* — Moyles IP, LLC

(57) ABSTRACT

An electric shock guard for an appliance having a charging port includes a body for being received on the appliance, and a port cover flexibly joined to the body for covering the charging port of the appliance. The port cover is formed from a material operative for dissipating electrostatic energy.

20 Claims, 7 Drawing Sheets

(56) References Cited

U.S. PATENT DOCUMENTS

| | | | |
|---|---|---|---|
| 2011/0219571 A1* | 9/2011 | Dyson | A47L 5/24 |
| | | | 15/344 |
| 2011/0230623 A1* | 9/2011 | Hirano | B29C 35/10 |
| | | | 525/309 |
| 2014/0323230 A1 | 10/2014 | Wakitani et al. | |
| 2017/0225577 A1* | 8/2017 | Chuang | H01R 13/5202 |

* cited by examiner

ELECTRIC SHOCK GUARD FOR APPLIANCE

CROSS-REFERENCE TO RELATED APPLICATIONS

This application claims the benefit of U.S. Provisional Application No. 62/492,857, filed May 1, 2017, and U.S. Provisional Application No. 62/572,287, filed Oct. 13, 2017, both of which are incorporated herein by reference in their entireties.

FIELD OF THE DISCLOSURE

This application is generally directed to an apparatus or device for protecting a user from electrical shock when using an appliance, such as a vacuum cleaner. More particularly, this application is directed to an apparatus or device for protecting a user from electrical shock when using a rechargeable appliance, such as a rechargeable vacuum cleaner. This application is further directed to a method of using such an apparatus or device.

BACKGROUND OF THE DISCLOSURE

The buildup of static electricity caused by a person walking on a carpeted surface, and subsequent transfer of the static electricity from that person to another in the form of an electric shock, is a well-known phenomenon.

A similar buildup of static electricity can occur in a vacuum cleaner, with the buildup inside the vacuum cleaner being attributable to the frictional forces of rolling the vacuum cleaner on a carpeted flooring surface, and/or because the dust particles collected during vacuuming can become charged as the dust particles collide with the interior surface of the vacuum cleaner parts.

Cordless, rechargeable vacuum cleaners often have an open (i.e., exposed) charging port that serves as a connection point for the electrical elements of the appliance and the electrical elements of the charging station or charger. The electrical elements are metallic and are good conductors of electricity. Thus, when static electricity builds up in the vacuum cleaner, and a human is sufficiently close to the exposed electrical elements in the charging port, there is a risk that static electricity may be discharged through the electrical elements, resulting in an electrical shock to the human.

Accordingly, there is a need for an apparatus and/or method that may be used to prevent the undesirable discharge of static electricity through the charging port of a rechargeable appliance.

BRIEF DESCRIPTION OF THE EXEMPLARY EMBODIMENTS

In one aspect, the present disclosure is directed generally to an apparatus or device for protecting a user from an electric shock when using an appliance, such as a rechargeable vacuum cleaner. The apparatus or device, which may be referred to as an electric shock guard (ESG) (or protective guard or sheath), generally serves to prevent the discharge of electricity from the appliance in the form of an electric shock to a user.

The ESG may be formed from any suitable material that prevents the discharge of static electricity through the electrical elements positioned within the charging port of the appliance. Such materials may generally be characterized as being electrostatic discharge materials, and more particularly, may be characterized as electrostatic dissipative materials. Examples of flexible materials that may be suitable for use with the present disclosure include, but are not limited to, silicone rubbers, neoprene rubbers, thermoplastic vulcanizates (such as Santoprene® TPV from ExxonMobil Chemical), or any combination thereof. Examples of rigid or semi-rigid materials that may be suitable for use with the present disclosure include, but are not limited to, polyethylene terephthalate, ABS, or an ABS/polycarbonate blend.

In some embodiments, the ESG may be formed from a flexible material or sheet having a unitary construction (i.e., such that the various parts of the ESG are integral with one another). When not in use, the ESG may have a generally planar configuration with a pair of surfaces or sides (e.g., an interior surface/side and an exterior surface/side) opposite one another. In use, the ESG may be configured as a wrap or sheath that extends around and/or attaches to at least a portion of the appliance, such that the interior surface of the ESG is in contact with the outer surface of the appliance.

In other embodiments, the ESG may be formed from multiple components that are assembled or joined to one another, rather than having a unitary construction.

It is also contemplated that the ESG may take the form of a rigid or semi-rigid, multi-part assembly in which two or more parts are molded (or otherwise formed) and snapped into position on the appliance.

It is further contemplated that the ESG may be configured as a rigid or semi-rigid body having a unitary (i.e., single-piece) construction that may be molded (or otherwise formed) and snapped into position on the appliance.

Although the ESG may vary widely in overall shape (i.e., perimeter shape and/or contours) depending on the particular appliance with which it designed for use, the ESG may generally include a port cover and/or plug, a portion for being gripped by the user (e.g., a wall or sheath/wrap portion), and at least one fastener or fastening element. The port cover and/or plug may be formed a material that dissipates electrostatic energy. In use, port cover and/or plug serves to overlie and/or extend into the charging port so that the electrical elements therein are not exposed to the user. As a result, any static electricity that builds up in the appliance is able to dissipate over time, rather than be directed to the charging point as a rapid point of release. The port cover and/or plug may be formed from a flexible material, so that the port cover and/or plug may be flexed and/or pivoted away from the appliance to access the charging port to charge the appliance.

Thus, in one exemplary embodiment, the ESG may include a body for being received (i.e., positioned) on the appliance and a port cover flexibly joined to the body. The ESG may further include a plug for being removably received within the charging port. In some variations, the plug may be configured as a projection extending from a surface of the cover. The ESG may further include at least one fastening element for securing the body on the appliance. In one variation of this embodiment, the body may be formed from a flexible material configured to extend at least partially around (i.e., enwrap) a handle of the appliance. In such a variation, the body may be a substantially planar sheet in a first configuration, and a substantially tubular sheath in a second configuration. In another variation, the ESG may be formed from a more rigid material. The ESG may include a plurality of fastening arms for securing the body on the appliance. The plurality of fastening arms may include a first pair of fastening arms that curve towards one another and a second pair of fastening arms that curved towards one another. The respective pairs of fastening arms may be rigid, but sufficiently flexible so that the arms can flex slightly away from one another for installing the electric shock guard on the appliance, as described in connection with the various other exemplary embodiments herein.

In another exemplary embodiment, the ESG may include a sheath portion for being in a contacting relationship with the appliance, and a port cover flexibly joined to the sheath portion. The port cover may be configured to at least one of overlie and extend into the charging port of the appliance. The port cover may include a plug for extending into the charging port of the appliance. The ESG may include at least one fastening element, such as those described in connection with the other exemplary embodiments herein.

In still another exemplary embodiment, the ESG may include a sheath portion for being positioned along the handle of the appliance, a port cover disposed along the sheath portion for being removably positioned over the charging port of the appliance, and at least one fastening element for securing the electric shock guard to the appliance. The port cover may include a projection dimensioned to be received within the charging port of the appliance. In this and other embodiments, the at least one fastening element may include a first pair of fastening arms in a facing relationship with one another, and a second pair of fastening arms in a facing relationship with one another. The respective pairs of fastening arms may be operative for flexing away from one another for securing the electric shock guard to the appliance. The first and second pairs of fastening arms may extend respectively from an upper end and a lower end of the sheath portion. In some embodiments, the first and second pairs of fastening arms may extend obliquely and upwardly respectively from an upper end and a lower end of the sheath portion.

In another aspect, the present disclosure is directed generally to a method of using an apparatus or device, for example, the ESG described herein, to prevent the discharge of electricity from the appliance in the form of an electric shock to a user. The method generally entails positioning the ESG on the appliance so that the port cover or plug overlies and/or extends into the charging port so that the electrical element(s) therein are not exposed to the user. In some embodiments, the method may further include applying or affixing the remainder of the ESG to the appliance, and fastening the ESG to secure the ESG in position on the appliance. The ESG is maintained in position during use and while charging, until subsequently removed by the user.

In still another aspect, the ESG may be used alone or in conjunction with a grounding device. The grounding device may generally serve as a mechanism or means of allowing current to flow from the appliance, for example, the vacuum cleaner, to the ground, to prevent the buildup of static electricity in the vacuum cleaner and/or release any static electricity that has accumulated within the appliance. In one example, the grounding device may be configured as a conductive tape, for example, a copper tape, that can be applied to surface of the appliance proximate to the ground (e.g., the surface of the vacuum cleaner head that contacts the flooring surface).

Various features, aspects, and advantages of the embodiments will become more apparent from the following detailed description, along with the accompanying figures, in which like numerals represent like components throughout the figures and text. The various described features are not necessarily drawn to scale, but are drawn to emphasize specific features relevant to some embodiments.

DETAILED DESCRIPTION

Figure 1A:
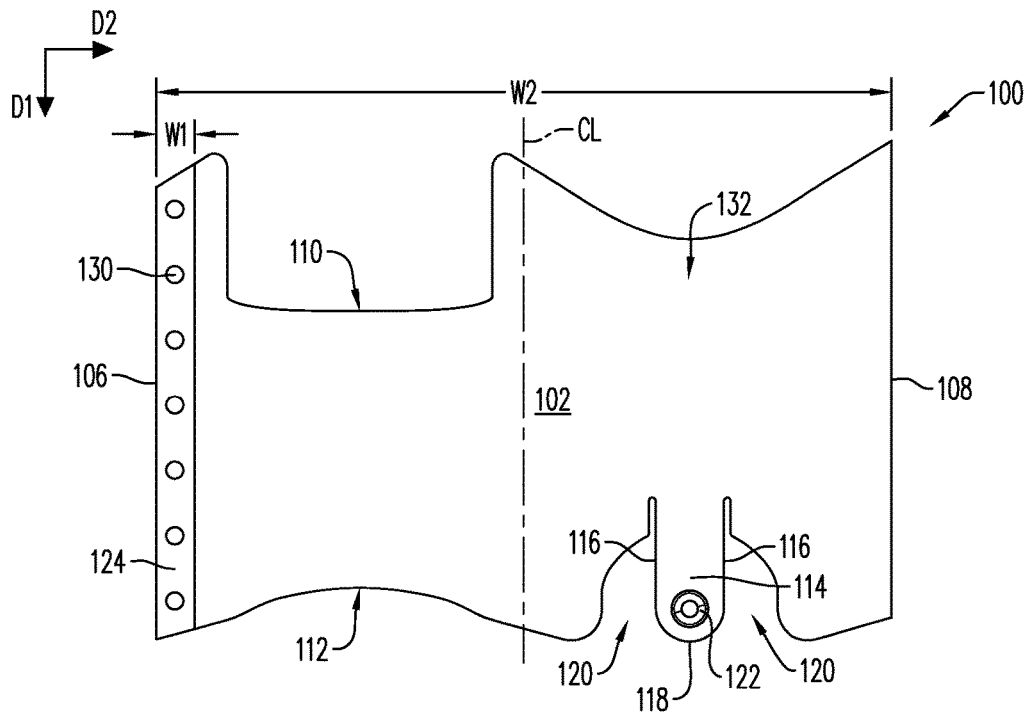
FIG. 1A is a schematic, top plan view of an interior side of an electric shock guard for use with an appliance, according to one aspect of the disclosure.
Figure 1B:
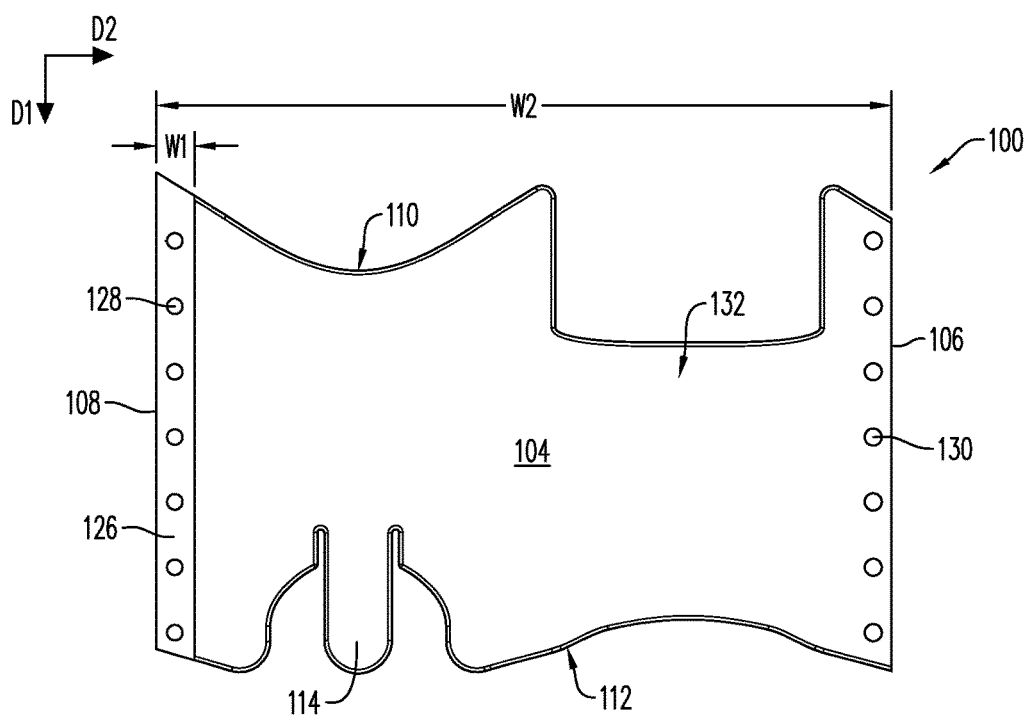
FIG. 1B is a schematic, top plan view of an exterior side of the electric shock guard of FIG. 1A.
Figure 1C:
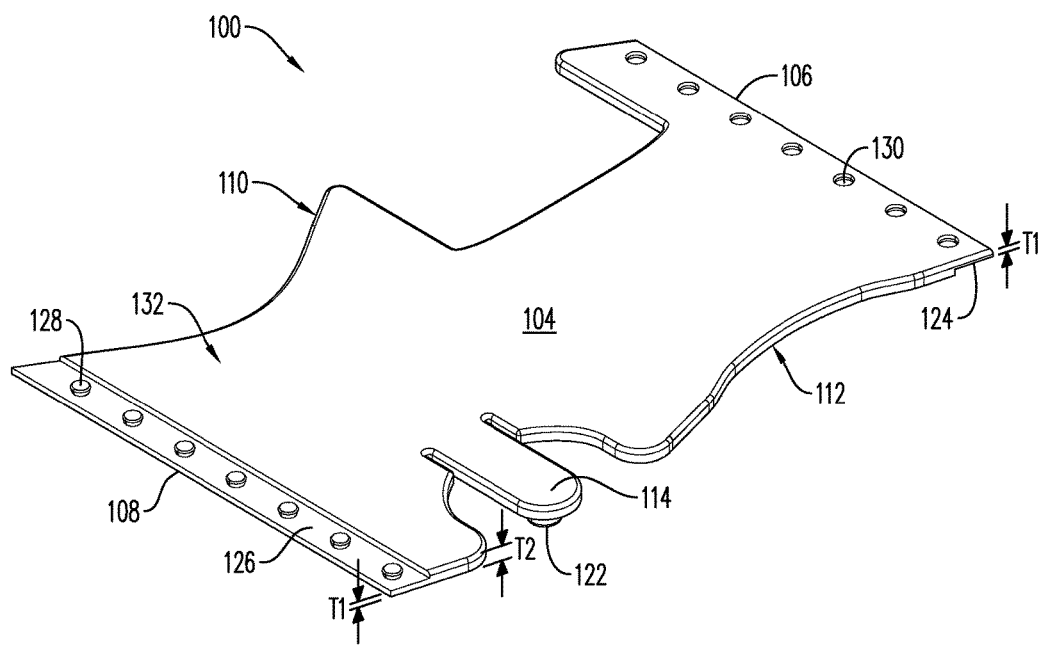
FIG. 1C is a schematic, perspective view of the electric shock guard of FIGS. 1A and 1B.
Figure 1D:
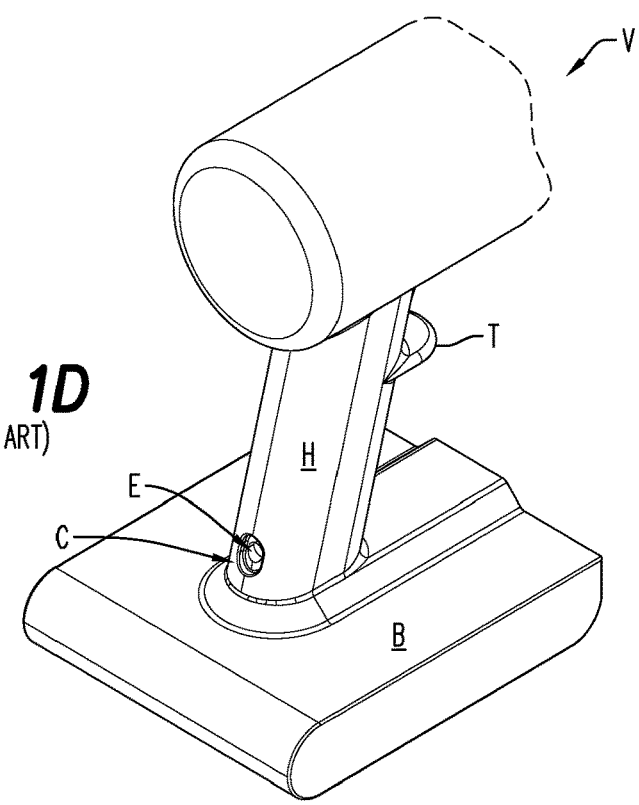
FIG. 1D is a schematic, perspective view of an exemplary appliance that may be used with the electric shock guard of FIGS. 1A-1C.
Figure 1E:
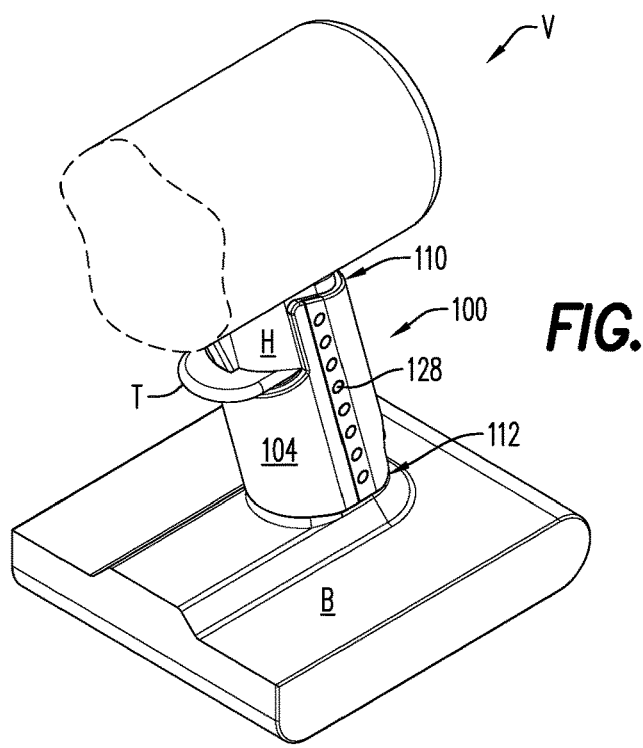
FIGS. 1E and 1F are alternate schematic, perspective views of the electric shock guard of FIGS. 1A-1C in use with the exemplary appliance of FIG. 1D.
Figure 1F:
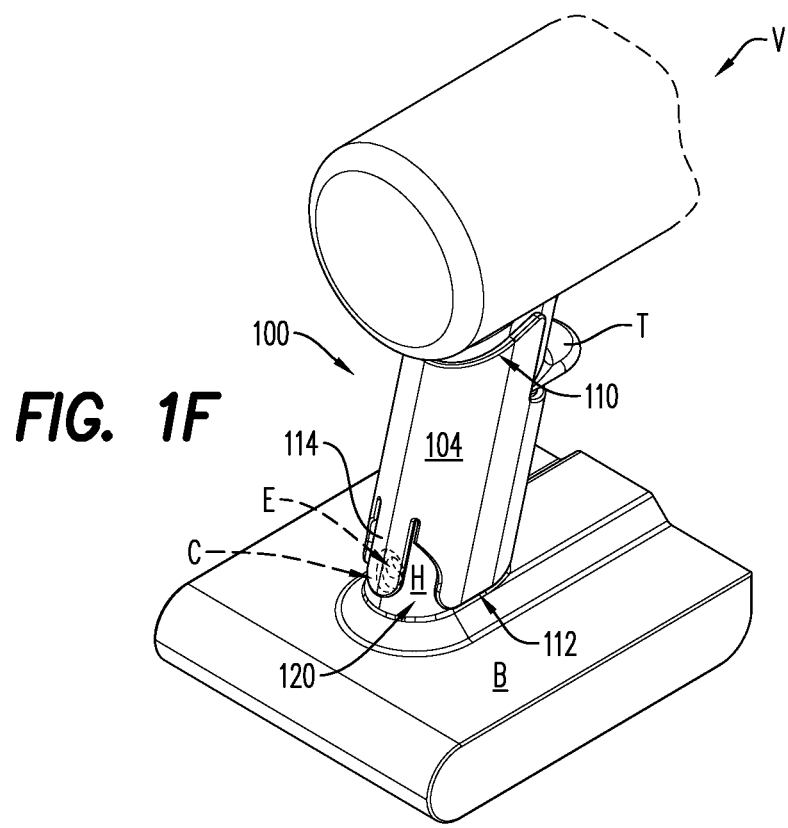

FIGS. 1A-1C schematically illustrate an exemplary electric shock guard (ESG) 100 for an appliance, such as a vacuum cleaner (see, e.g., FIGS. 1D-1F). In this example, the ESG 100 may generally comprise a flexible sheet of material having a first surface or side (interior surface or side) 102 and a second surface (exterior surface or side) 104. As described above, the material may generally comprise any suitable electrostatically dissipative material.

As shown in FIGS. 1A and 1B, for ease of description and not limitation, the ESG 100 may be described as including a first pair of edges (i.e., peripheral edges) 106, 108 extending in a first direction D1 opposite one another, and a second pair of edges (i.e., peripheral edges) 110, 112 generally extending in a second direction D2 opposite one another. Edges 106, 108 each generally extend between the terminal points (i.e., ends or endpoints) of the second pair of edges 110, 112 (e.g., from edge 110 to edge 112). Likewise, edges 110, 112 generally extend between the terminal points (i.e., ends or endpoints) of the first pair of edges 106, 108 (e.g., from edge 106 to edge 108). Edges 106, 108, 110, 112 collectively define a peripheral edge (i.e., peripheral boundary or perimeter) of the ESG 100.

It will be noted that, in the illustrated embodiment, edges 106, 108 are substantially straight (i.e., linear) and substantially parallel to one another. In contrast, edges 110, 112 each include both linear and curvilinear portions, some of which extend more generally in the first direction D1, and some of which extend more generally in the second direction D2. However, as will be evident from the following discussion, the presence or absence of such shaped or contoured edges may depend on the need to accommodate various features of the appliance for which the ESG is intended to be used. Thus, numerous other possibilities are contemplated hereby.

Viewing FIGS. 1A-1C, the ESG 100 includes a port cover 114 having a generally elongate shape defined in part by a pair of opposed side edges (or side edge portions) 116 and an outermost peripheral edge (or peripheral edge portion) 118. In this example, the side edges 116 are substantially straight and substantially parallel to edges 106, 108, while the outermost peripheral edge 118 is substantially rounded. However, other possibilities are contemplated. The port cover 114 is spaced from adjacent portions of the ESG 100 by cutouts 120. The precise shape and dimensions of cutouts 120 may vary, depending on the flexibility of the material used to form the ESG 100, as needed to provide access to the charging port of the appliance, as will be discussed further below.

Additionally, it is noted that, in this example, the port cover 114 is offset from a centerline CL (FIG. 1A) extending in the first direction D1 along the width W2 of the ESG 100. However, in other embodiments, the port cover 114 may be configured to be centered along the width W2 of the ESG, or may be positioned otherwise differently than illustrated, as needed to accommodate the various features of the appliance on which the ESG is being used.

The ESG 100 further includes a plug 122 (i.e., an insulating plug or protective plug) projecting (i.e., extending outwardly) the interior surface 102 of the port cover 114. The plug 122 is positioned proximate to, but spaced from, the outermost edge 118 of the port cover 114, such that some marginal area of the port cover 114 extends around the plug 122. As will be discussed in connection with FIGS. 1D-1F, in use, the plug 122 is shaped and dimensioned to fit snugly within the charging port of the appliance to prevent the discharge of static electricity through the metallic elements within the port. Thus, although the illustrated plug 122 is substantially circular in shape and dimensioned as shown, countless other shapes, dimensions, and configurations may be used.

As best seen in FIG. 1C, the interior side 102 of the ESG 100 includes a recessed marginal area 124 extending along edge 106. Similarly, the exterior side 104 of the ESG 100 includes a recessed marginal area 126 extending along edge 108. Marginal areas 124, 126 may each be approximately equal in width W1 (FIGS. 1A and 1B) and may each have a reduced thickness T1 relative to the thickness T2 of the remainder of the ESG 100 (which otherwise may be generally uniform in thickness except for the plug 122). In some embodiments, marginal areas 124, 126 may each have a thickness T1 that is from about 40% to about 60% of the thickness T2 of the remainder of the ESG 100, so that when marginal areas 124, 126 are overlapped with one another, as will be discussed below, the thickness of the overlapped areas 124, 126 is approximately the same as the remainder of the ESG 100. In one particular example, marginal areas 124, 126 may each have a thickness T1 that is about 50% of the thickness T2 of the remainder of the ESG 100. However, other possibilities are contemplated.

Viewing FIG. 1C, marginal area 126 includes a plurality of fastening elements 128, for example, protrusions or projections, extending outwardly from (e.g., upwardly or away from) the recessed surface of the marginal area 126. Marginal area 124 includes a corresponding plurality of apertures 130 (i.e., cutouts or holes) extending through the thickness T1 of the material within the marginal area 124. The apertures 130 are dimensioned and positioned to receive the fastening elements or projections 128 when the marginal areas 124, 126 are brought into an overlapping configuration with one another.

The remainder of the ESG 100 may generally be referred to as the sheath portion (or body) 132 of the ESG, which in use, forms a sheath-like tubular structure (or sheath) that wraps around the appliance, with the port cover 114 extending therefrom, as will be discussed further below.

FIGS. 1D-1F schematically illustrate the use of the ESG 100 of FIGS. 1A-1C according to one exemplary method. FIG. 1D schematically illustrates a handheld vacuum appliance V (sometimes referred to as a "stick-vac") that generally includes a battery and motor for driving a suction device (not shown) that can be attached thereto. The appliance V includes a handle H for holding the appliance V, a trigger T for activating the appliance V, and a base B. The appliance V also includes a charging port C positioned along the handle H proximate to the base B. The charging port C includes a metallic electrical component E. As discussed above, such electrical elements E may be prone to the discharge of static electricity that builds up during use of the appliance. The risk of discharge may be particularly notable in this instance since the user's hand is intended to positioned directly adjacent to the electrical element E during use.

FIGS. 1E and 1F schematically illustrate the ESG of FIGS. 1A-1C fastened to the appliance V of FIG. 1D. To install or apply the ESG 100 to the appliance V according to one exemplary method, the user may position the ESG so that the interior surface 102 of the ESG 100 faces the appliance V, and align the port cover 114 so that the plug 122 (hidden from view) overlies the charging port C of the appliance. The user may then apply pressure to insert the plug 122 into the charging port C. The user may then wrap the sheath 132 around the handle H of the appliance V until the marginal areas 124, 126 of the ESG 100 overlap with one another (e.g., with area 126 being closer to the appliance and area 124 being more distal from the appliance, although the reverse is also contemplated). The user may then simply align the fastening projections 128 with the apertures 130 and apply pressure to join the two marginal areas 124, 126 of the ESG 100 to one another to form a tubular structure that extends around and enwraps the handle H of the appliance V. It will be noted that this precise sequence of steps is not required, and countless variations are contemplated hereby.

In this configuration, the edges 106, 108 of the ESG 100 generally extend along a length of the appliance handle H and may be generally upright when the handle H is in a resting position, while edges 110, 112 are circumferential edges that may extend at least partially around the circumference of the handle H. The port cover 122 extends generally downwardly from the sheath portion or body 132 of the ESG 100 (in a generally lengthwise direction) along the length of the handle H. The various contours of edges 110, 112 extend along and/or around the various features of the appliance, for example, the trigger T, and the base B.

During use, as static electricity builds within the vacuum cleaner V, the plug 122 (hidden from view) positioned within the charging port C, and the surrounding marginal area off the port cover 114 extending around the plug 122 ensure that the charging port C is amply sealed. In this manner, the charging port C can no longer serve as a ready conduit for releasing the stored energy within the vacuum cleaner, and the risk of the user being shocked is mitigated, if not substantially or entirely eliminated.

When the user is ready to charge the appliance V, the flexible port cover 114 may be deflected away from the appliance V along cutouts 120 and a charging cable (not shown) may be inserted into the appliance V. The ESG 100 does not need to be removed to charge the appliance V, unless the user chooses to do so.

As stated above, it is contemplated that in this and other embodiments, the ESG may be formed from various materials, may have various constructions, and may have various properties, depending on the particular application for which the ESG is intended to be used.

In the illustrated example, in which the ESG is intended for use along a handle of an appliance, the thickness of the ESG may be from about 0.1 to about 0.3 inches, for example, about 0.2 inches, to minimize adding excess circumference to the handle. Additionally, if desired, it may be desirable to select a material that provides some level of cushioning to facilitate gripping by the user. For example, in one exemplary embodiment, the ESG may be formed from a material having a Shore D hardness of from about 80 to 100 Durometer, for example, about 90 Durometer. Additionally or alternatively, the ESG may be provided with a textured surface to enhance gripping and/or user comfort. Such properties may be suitable for other applications; however, countless other possibilities are contemplated as well.

Figure 2:
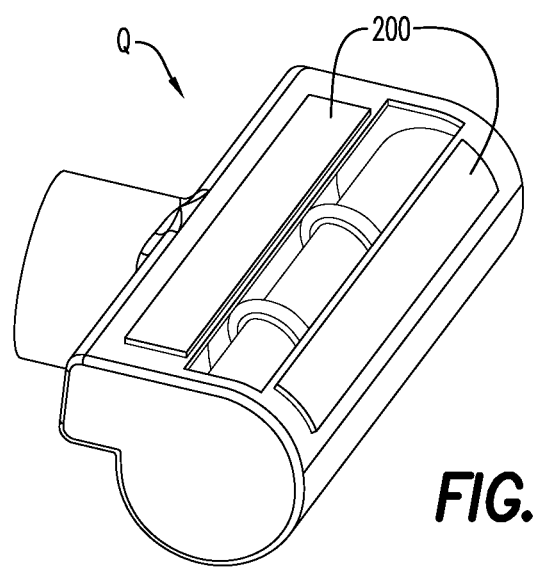
FIG. 2 schematically depicts one exemplary grounding mechanism that may be used alone or in conjunction with the electric shock guard of the present disclosure, installed on an exemplary appliance.

FIGS. 2A and 2B schematically depict the use of an exemplary grounding device 200 with an exemplary appliance, for example, a vacuum cleaner. The grounding device 200 may be used alone or in conjunction with an ESG as described herein (e.g., ESG 100) to further minimize the risk of the user receiving an electric shock while using the appliance.

In the illustrated example, the grounding device 200 is configured as a conductive tape, which may be provided with a pre-applied adhesive (e.g., a pressure-sensitive adhesive, not shown) and, optionally, a removable liner (not shown) overlying/covering the adhesive. In such a case, the conductive tape may be applied by removing the liner and affixing the adhesive side of the tape to the floor-contacting surface of the appliance (e.g., the floor-contacting side of the vacuum head Q), as shown in FIG. 2B. During use, as the user moves the vacuum cleaner back and forth along the flooring surface, the conductive tape 200 assists with preventing the buildup of static electricity within the appliance, and allows any static electricity that has built up to dissipate to the ground more easily.

Here, the conductive tape is illustrated as being a copper tape; however, other conductive materials may be suitable. Additionally, the conductive tape is shown as being applied as two pieces to the head of the vacuum cleaner. However, it is contemplated that shapes, sizes, and numbers of pieces may be used, depending on the needs of the particular application. It is also contemplated that other locations for applying the tape to the appliance may be suitable. Finally, it is contemplated that the grounding device or mechanism may have other configurations, provided that it suitably allows electrostatic energy to dissipate from the appliance.

If desired, an ESG (such as ESG 100 or ESG 300, below) and a grounding mechanism (such as conductive tape 200) may be provided together as a "kit". The purchaser may be provided with instructions for installing both the ESG and the grounding device on the appliance.

FIGS. 3A-3F schematically depict another exemplary electric shock guard (ESG) 300 according to various aspects of the disclosure. In this example, the ESG 300 comprises a rigid or semi-rigid body shaped to be installed on (e.g., fitted or snapped onto) the appliance handle (see, e.g., handle H of FIG. 1D). The ESG 300 of FIGS. 3A-3D is illustrated as having a unitary construction. However, it is contemplated that the ESG 300 may be provided as a multi-component construct that is assembled by the user.

The body of the ESG 300 may be generally described as having an anterior portion 302, a posterior portion 304, an interior side or surface 306, an exterior side or surface 308, and a substantially continuous peripheral edge 310. The peripheral edge 310 extends along the outermost edges of various parts of the ESG 300 and generally defines an outermost boundary of the ESG 300. In use, the posterior portion 304 of the ESG 300 may lie along the posterior side of the appliance handle, while the anterior portion 302 of the ESG 300 may lie along the sides and anterior side of the appliance handle.

The anterior portion 302 of the ESG 300 generally includes a plurality of projections or arms (e.g., fastening projections or arms) shaped to extend around the handle of the appliance. Specifically, in this example, the ESG 300 includes a first pair of arms 312a, 312b (e.g., upper arms when the ESG 300 is in use) and a second pair of arms 314a, 314b (e.g., lower arms when the ESG 300 is in use) extending from the posterior portion 304 of the ESG 300. The first pair of arms 312a, 312b are generally curved inwardly towards one another (and substantially mirror images of one another), and the second pair of arms 314a, 314b are generally curved inwardly towards one another (and substantially mirror images of one another), so that the curvature of the arms 312a, 312b, 314a, 314b substantially accommodates the shape of the handle of the appliance. Accordingly, the specific contours of the arms 312a, 312b, 314a, 314b may vary for each embodiment, as needed to securely enwrap the handle of a particular appliance. In this example, the arms 312a, 312b, 314a, 314b are shaped to receive a substantially cylindrical appliance handle. However, in other embodiments, the arms may be shaped to enwrap other appliance handle geometries.

The posterior portion 304 of the ESG 300 generally comprises a wall 316 (e.g., a posterior wall 316) extending from and between the first pair of arms 312a, 312b and the second pair of arms 314a, 314b. The exterior surface 308 of the posterior wall 316 may generally be in contact with the user's palm when the ESG 300 is attached to the appliance handle (i.e., such that the exterior surface 306 of the posterior wall 316 is a contacting surface or gripping surface, and the wall 316 is a contacting or gripping portion of the ESG), while the arms 312a, 312b, 314a, 314b are configured to secure the ESG 300 to the handle of the appliance. As described above in connection with arms 312a, 312b, 314a, 314b, the curvature of the wall 316 may vary, depending on the specific geometry of the appliance handle. In the illustrated embodiment, the wall 316 has a slightly curved or arcuate shape to accommodate a substantially cylindrical appliance handle. However, in other embodiments, the wall may be shaped to conform to other appliance handle geometries.

It will be noted that the anterior portion 302 and the posterior portion 304 of the ESG 300, and more particularly, the arms 312a, 312b, 314a, 314b and posterior wall 316, are generally contiguous with one another and comprise integral parts of a unitary structure or body. Accordingly, it may be difficult to define precise boundaries between the various features. Nonetheless, for purposes of explanation, and not limitation, such features may be described or characterized as being as individual parts of the ESG 300.

Figure 3A:
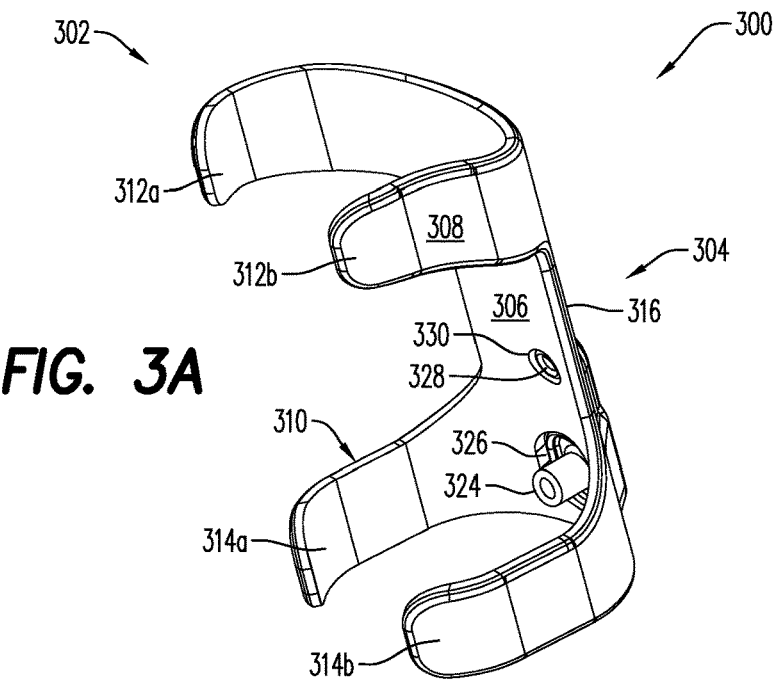
FIG. 3A is a schematic, perspective view of another electric shock guard for use with an appliance, according to another aspect of the disclosure.
Figure 3B:
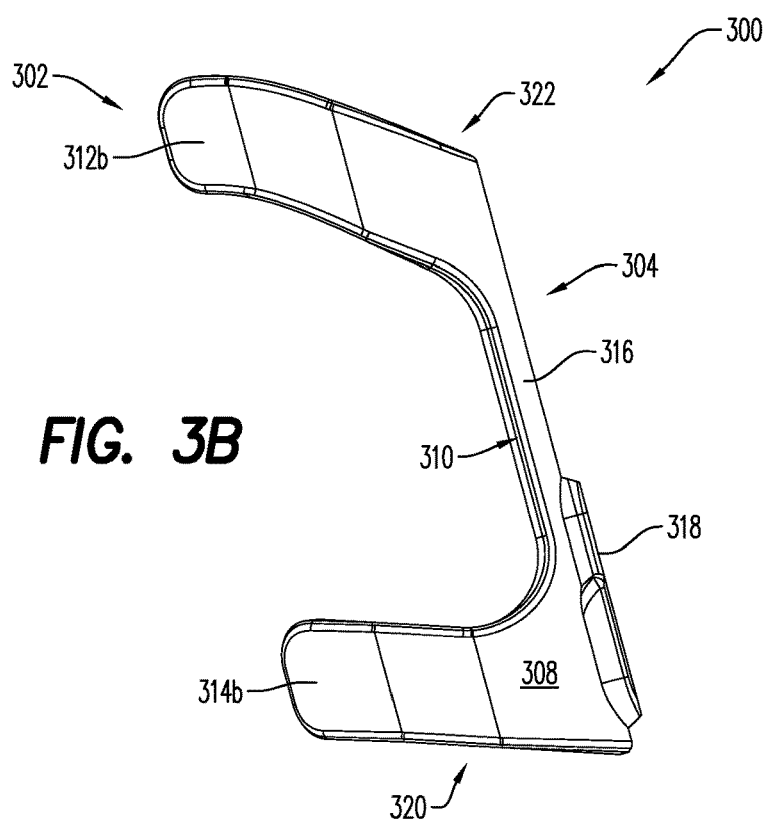
FIG. 3B is a schematic, side view of the electric shock guard of FIG. 3A.
Figure 3C:
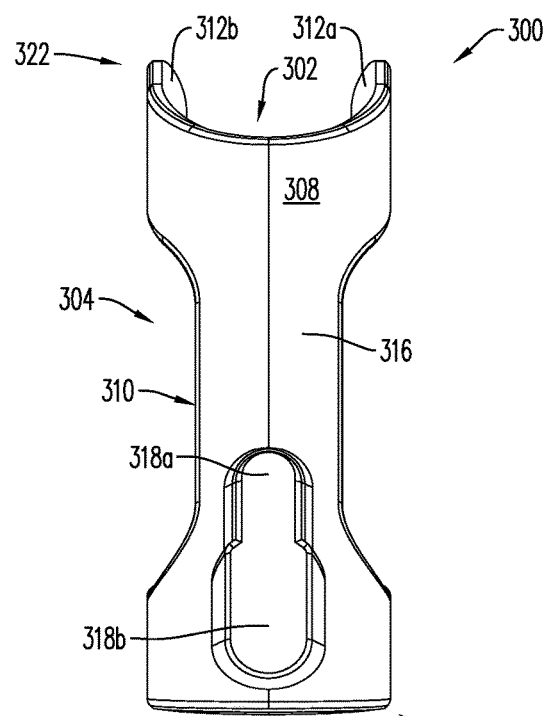
FIG. 3C is a schematic, rear view of the electric shock guard of FIG. 3A.
Figure 3D:
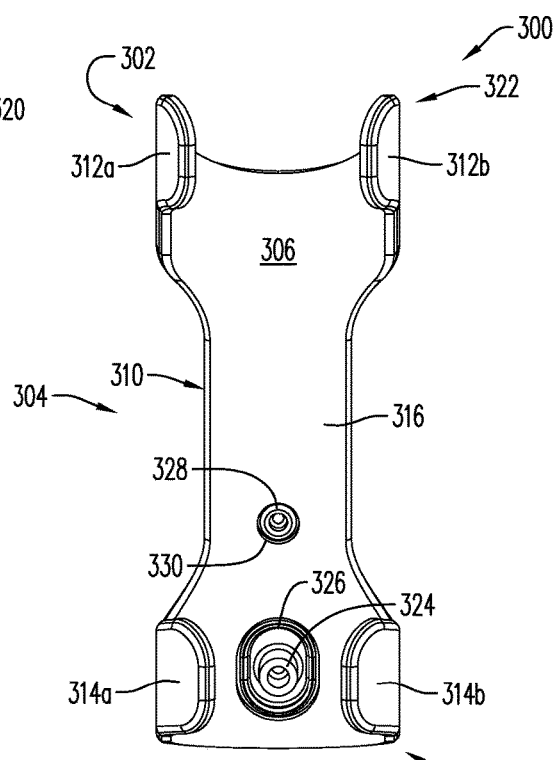
FIG. 3D is a schematic, front view of the electric shock guard of FIG. 3A.
Figure 3E:
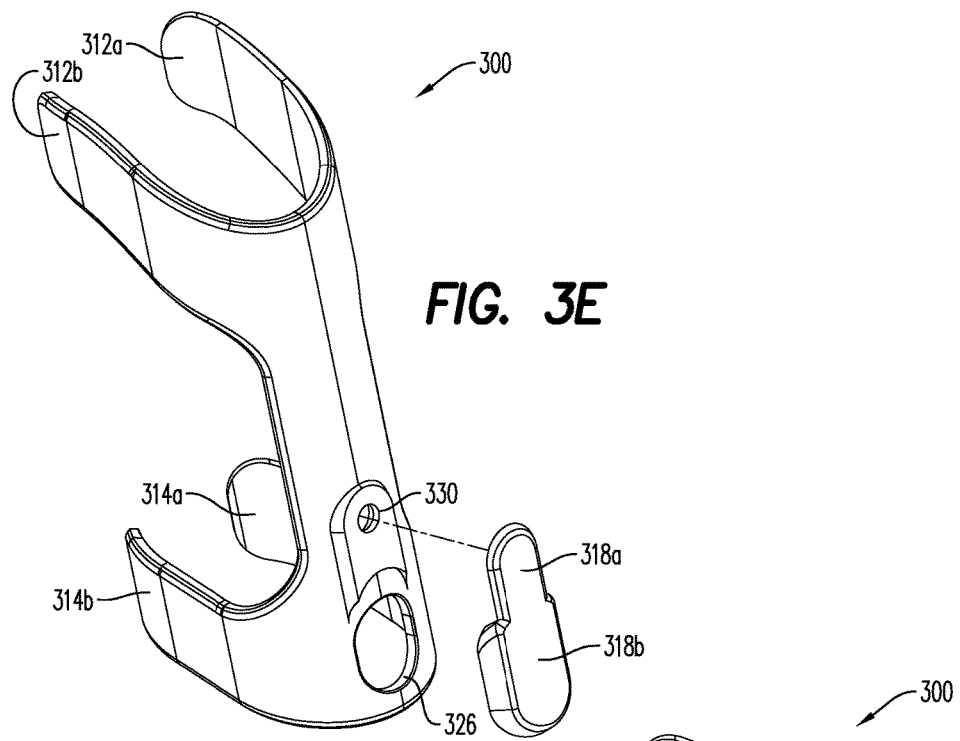
FIG. 3E is a schematic, exploded view of the electric shock guard of FIG. 3A.

In the exemplary embodiment illustrated in FIGS. 3A-3D, the first pair of arms 312a, 312b and the second pair of arms 314a, 314b extend obliquely from the posterior wall 316. In one configuration with the posterior wall 316 in a substantially upright configuration, as illustrated in FIG. 3B, the first pair of arms 312a, 312b and the second pair of arms 314a, 314b may each extend obliquely and upwardly from the posterior wall 316. However, other configurations of the arms 312a, 312b, 314a, 314b relative to the wall 316 are contemplated.

The posterior portion 304 of the ESG 300 further includes a port cover 318 having an elongate shape with generally rounded ends opposite one another. In this example, the port cover 318 includes a first portion (e.g., upper portion) 318a and a second portion (e.g., lower portion) 318b, where the second portion 318b is positioned proximate to a first end 320 of the ESG 300 (e.g., a lower end of the ESG 300 when in use) and distal from a second end of the ESG 300 (e.g., an upper end 322 of the ESG 300 when in use).

The ESG 100 further includes a plug 324 (i.e., an insulating plug or protective plug) projecting (i.e., extending outwardly) from an interior side of the lower portion 318b of the port cover 318 towards the anterior portion 302 of the ESG 300 through an opening 326 in the posterior wall 316. The plug 324 is shaped and dimensioned to fit snugly within the charging port of the appliance to prevent the discharge of static electricity through the metallic elements within the port. Thus, although the illustrated plug 324 is substantially circular in shape and dimensioned as shown, countless other shapes, dimensions, and configurations may be used.

Figure 3F:
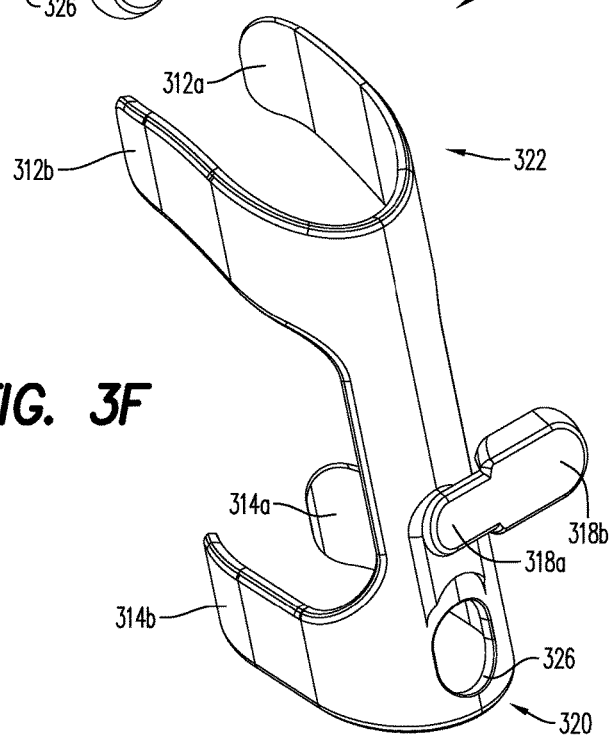
FIG. 3F is a schematic, perspective view of the electric shock guard of FIG. 3A, with the port cover in an open and at least partially rotated configuration.

The port cover 318 may be formed from a somewhat flexible material, so that the port cover 318 can be flexed away from the posterior wall 316 to release the plug 324 from the charging port (e.g., charging port C of FIG. 1D). As shown schematically in FIG. 3F, the port cover 318 may be adapted to rotate around a pivotable connection (e.g., a peg or other projection 328 inserted at least partially through and/or engaged with an opening 330 in the posterior wall 316) (FIGS. 3D, 3E) positioned along the upper portion 318b of the port cover, so that the port cover can be rotated upwardly towards the upper end 322 of the ESG 300 to reveal the charging port of the appliance (e.g., charging port C of FIG. 1D). In such a configuration (i.e., the open and at least partially rotated position), the lower portion 318b of the port cover 318 may generally be positioned more proximate to the upper end 322 of the ESG 300 than when in the closed position (FIG. 3F). When charging is complete, the port cover 318 can be rotated back into the closed position and the plug 324 may be re-inserted through the opening 326 into the charging port to prevent dissipation of static electricity from the handle to the user's hand.

The ESG 300 may be formed from various materials and may be formed in any manner, for example, using injection molding, thermoforming, or any other suitable technique. The body of the ESG 300 may be formed from any suitable polymeric material, for example, but not limited to, polyethylene terephthalate, ABS, or an ABS/polycarbonate blend. The body of the ESG 300 (e.g., the arms 312a, 312b, 314a, 314b and posterior wall 316) may be formed to be rigid or semi-rigid, with the arms being able to flex slightly (i.e., so that the respective pairs of arms may be urged outwardly away from each other) to attach the ESG 300 onto the handle of the appliance. The thickness of the arms may also be selected to facilitate flexing without breaking. For example, in one embodiment, the thickness of the body (e.g., arms) may be from about 0.06 to about 0.010 inches, for example, about 0.08 inches. The port cover 318 may be formed from a more flexible material, for example, silicone rubbers, neoprene rubbers, thermoplastic vulcanizates, thermoplastic polyurethane, or any combination thereof.

If desired, the ESG 300 may be further secured to the handle of the appliance using an adhesive material. The adhesive may comprise an adhesive tape, self-supporting adhesive, or any other suitable adhesive-based fastener. In one embodiment, the ESG 300 may include a pre-applied adhesive tape (not shown) with a release liner that may be pulled off by the user when the ESG 300 is in the desired position on the handle. However, countless other possibilities are contemplated hereby.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

By way of example, and not limitation, various other embodiments according to the present disclosure may include:

An ESG for an appliance, including a material operative for dissipating electrostatic energy, where the material is shaped to overlie a charging port of an appliance;

An ESG for an appliance, including a flexible material operative for dissipating electrostatic energy, where the flexible material is configured to define a cover for overlying a charging port of an appliance, and at least one fastening element for securing the cover to the appliance;

An ESG for use with an appliance having a charging port, the electrical shock guard including at least one of a port cover for overlying the charging port of the appliance, and a plug for extending into the charging port of the appliance, where the at least one of the port cover and the plug comprise a material operative for dissipating electrostatic energy;

An ESG for a rechargeable appliance, the ESG including a flexible material operative for dissipating electrostatic energy, the flexible material being configured to define a sheath portion for extending around at least a portion of the appliance, a port cover for overlying the charging port of the appliance, and a plug projecting from the port cover for extending into the charging port of the appliance;

A method of using an ESG as described herein;

A method of preventing the discharge of static electricity from an appliance, as described herein;

An assembly for use with a rechargeable appliance, including an ESG and a grounding device as described herein;

A kit for reducing the risk of electric shock from an appliance, including an ESG and a grounding device as described herein;

A product assembly for reducing the risk of electric shock from a rechargeable appliance, including a material operative for dissipating electrostatic energy, where the material is shaped to overlie and optionally be inserted within a charging port of an appliance, and a conductive tape for being applied to a surface of the appliance;

An ESG for use with an appliance having a charging port, the ESG including a substantially rigid body including a wall and a plurality of fastening arms, and a port cover for overlying the charging port of the appliance; and An ESG for an appliance having a charging port, the ESG including a substantially rigid body including a wall and a plurality of fastening arms, where the wall and fastening arms are configured to extend around a handle of the appliance, a flexible port cover for being removably positioned over the charging port of the appliance, and a plug projecting from the port cover, where the plug is configured to be received within the charging port of the appliance.

Countless other embodiments are contemplated hereby.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more", and "at least one" can be used interchangeably herein. Furthermore, references to "one embodiment", "some embodiments", "an embodiment", and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first", "second", "upper", "lower", etc. are used to identify one element from another, and unless otherwise specified are not meant to refer to a particular order or number of elements. All directional references (e.g., "upper", "lower", "upward", "downward", "left", "right", "leftward", "rightward", "top", "bottom", "above", "below", "vertical", "horizontal", "clockwise", and "counterclockwise") are used only for identification purposes to aid the reader's understanding of the various embodiments of the present invention, and do not create limitations, particularly as to the position, orientation, or use of the invention unless specifically set forth in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate", "compute" and variations thereof, as used herein, are used interchangeably and include any type of methodology, process, mathematical operation, or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An electric shock guard for an appliance having a charging port, the electric shock guard comprising:
   a rigid or semi-rigid body configured for being removably received on an outer surface of the appliance; and
   a port cover flexibly joined to the body, wherein
      the port cover is configured to move between an open position and a closed position, and in the closed position, the port cover covers and at least partially extends into the charging port of the appliance, and
      the port cover comprises a material operative for dissipating electrostatic energy.

2. The electric shock guard of claim 1, further comprising at least one fastening element for securing the body on the appliance.

3. The electric shock guard of claim 1, wherein the body comprises a flexible material configured to extend at least partially around a handle of the appliance.

4. The electric shock guard of claim 1, wherein the body is substantially tubular.

5. The electric shock guard of claim 1, further comprising a plurality of fastening arms extending from the body, wherein the plurality of fastening arms is for securing the body on the appliance.

6. The electric shock guard of claim 5, wherein the plurality of fastening arms comprises:
a first pair of fastening arms curved towards one another; and
a second pair of fastening arms curved towards one another.

7. The electric shock guard of claim 1, further comprising a plug for being removably received within the charging port,
wherein the plug is shaped and dimensioned to fit within the charging port to prevent discharge of static electricity through at least one metallic element within the charging port.

8. The electric shock guard of claim 7, wherein the plug extends from the port cover.

9. An electric shock guard for an appliance including a charging port, the electric shock guard comprising:
a substantially tubular sheath configured for being in a removable contacting relationship with an outer surface of the appliance; and
a port cover flexibly joined to the tubular sheath, wherein
the port cover comprises a material operative for dissipating electrostatic energy, wherein
the port cover is configured to move between an open position and a closed position, and in the closed position overlies and at least partially extends into the charging port of the appliance.

10. The electric shock guard of claim 1, wherein the port cover includes a plug for extending into the charging port of the appliance.

11. The electric shock guard of claim 1, further comprising a fastening element for securing the electric shock guard to the appliance.

12. The electric shock guard of claim 1, wherein the fastening element comprises a plurality of curved fastening arms configured to at least partially enwrap the appliance.

13. The electric shock guard of claim 12, wherein the plurality of curved fastening arms comprises
a first pair of fastening arms in a facing relationship with one another, the first pair of fastening arms being operative for flexing away from one another; and
a second pair of fastening arms in a facing relationship with one another, the second pair of fastening arms being operative for flexing away from one another.

14. The electric shock guard of claim 13, wherein
the first pair of fastening arms extends obliquely from an upper end of the tubular sheath, and
the second pair of fastening arms extends obliquely from a lower end of the tubular sheath.

15. An electric shock guard for an appliance, the appliance having a handle including a charging port, the electric shock guard comprising:
a substantially tubular sheath for being removably positioned along an outer surface of the handle of the appliance;
a port cover positioned along the tubular sheath, wherein
the port cover comprises a material operative for dissipating electrostatic energy, and
the port cover is configured to move between an open position and a closed position, and in the closed position, the port cover is positioned over and at least partially extends into the charging port of the appliance; and
at least one fastening element for securing the electric shock guard to the appliance.

16. The electric shock guard of claim 15, wherein the port cover includes a projection dimensioned to be received within the charging port of the appliance, wherein the projection comprises a material operative for dissipating electrostatic energy.

17. The electric shock guard of claim 15, wherein the at least one fastening element comprises
a first pair of fastening arms in a facing relationship with one another; and
a second pair of fastening arms in a facing relationship with one another.

18. The electric shock guard of claim 17, wherein
the first pair of fastening arms are operative for flexing away from one another for securing the electric shock guard to the appliance; and
the second pair of fastening arms are operative for flexing away from one another for securing the electric shock guard to the appliance.

19. The electric shock guard of claim 17, wherein
the first pair of fastening arms extends from an upper end of the tubular sheath; and
the second pair of fastening arms extends from a lower end of the tubular sheath.

20. The electric shock guard of claim 17, wherein
the first pair of fastening arms extends obliquely and upwardly from the upper end of the tubular sheath; and
the second pair of fastening arms extends obliquely and upwardly from the lower end of the tubular sheath.

* * * * *